US008565803B2

(12) United States Patent
Namm et al.

(10) Patent No.: US 8,565,803 B2
(45) Date of Patent: Oct. 22, 2013

(54) METHOD AND APPARATUS FOR COMMUNICATING AMONGST TWO-WAY RADIOS

(75) Inventors: Joseph C. Namm, Plantation, FL (US);
Jorge L. Garcia, Plantation, FL (US);
Scott H. Richards, Plantation, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 457 days.

(21) Appl. No.: 12/860,968

(22) Filed: Aug. 23, 2010

(65) Prior Publication Data
US 2012/0046062 A1    Feb. 23, 2012

(51) Int. Cl.
*H04B 7/00*    (2006.01)
*H04B 1/38*    (2006.01)

(52) U.S. Cl.
USPC ..... 455/520; 455/90.2; 455/553.1; 455/426.1

(58) Field of Classification Search
USPC ......... 455/517–520, 553.1, 90.2, 78, 79, 500, 455/426.1, 412.1, 414.1, 416, 420; 370/352, 389, 338, 328
See application file for complete search history.

(56) References Cited

U.S. PATENT DOCUMENTS

| 5,214,790 | A * | 5/1993 | Kozlowski et al. | ........... 455/518 |
| 5,901,342 | A * | 5/1999 | Heiskari et al. | ............ 455/11.1 |
| 7,616,099 | B2 * | 11/2009 | Mackjust et al. | ........ 340/426.13 |
| 2004/0190483 | A1 * | 9/2004 | Shahaf et al. | ................ 370/347 |
| 2004/0235506 | A1 * | 11/2004 | Roettger et al. | .............. 455/502 |
| 2005/0070320 | A1 * | 3/2005 | Dent | ............................. 455/516 |
| 2005/0186955 | A1 * | 8/2005 | Kramer et al. | ............. 455/422.1 |
| 2007/0010241 | A1 * | 1/2007 | Wachter et al. | ............... 455/423 |
| 2007/0142072 | A1 | 6/2007 | Lassally | |
| 2008/0009308 | A1 * | 1/2008 | Bar et al. | ................... 455/550.1 |
| 2010/0142434 | A1 * | 6/2010 | Rodmell et al. | ............. 370/315 |

FOREIGN PATENT DOCUMENTS

| EP | 1026908 A2 | 8/2000 |
| GB | 2287612 A | 9/1995 |
| GB | 2316271 A | 2/1998 |
| WO | 2004030387 A1 | 4/2004 |

OTHER PUBLICATIONS

International Search Report and Written Opinion mailed on Nov. 7, 2011 for International Application No. PCT/US2011/045642.
"Terrestrial Trunked Radio (TETRA); Technical Requirements for Direct Mode Operation (DMO); Part 1: General Network Design," ETSI Draft; 08196V121, European Telecommunications Standards Institute (ETSI), 650, Route Des Lucioles; F-06921 Sophia-Antipolis; France, No. V1.2.1, Jul. 24, 2009, pp. 1-44.

(Continued)

Primary Examiner — Dominic E Rego
(74) Attorney, Agent, or Firm — Barbara R. Doutre

(57) ABSTRACT

A method and apparatus for communicating amongst two-way radios is disclosed. The method includes operating a two-way radio 130 in either a trunked mode or conventional mode over an operating frequency and scanning an auxiliary channel by the two-way radio 130 to enable radio communication on the auxiliary channel while maintaining the operating frequency active. The radio 130 further detects a signal on the auxiliary channel with another radio 150 and communicating on the auxiliary channel in an intercom mode to provide an intercom radio-to-radio communication amongst all radios 130, 140 scanning on the auxiliary channel.

17 Claims, 4 Drawing Sheets

(56) References Cited

OTHER PUBLICATIONS

"Terrestrial Trunked Radio (TETRA); Voice Plus Data (V+D); Designers' Guide; Part 3: Direct Mode Operation (DMO)," Technical Report, European Telecommunications Standards Institute (ETSI), 650, Route Des Lucioles; F-06921 Sophia-Antipolis; France, No. V1.3.3, Jun. 1, 2009.

Flycom Avionics Ltd.—PTT Switches—Extracted from: http://www.flycom.co.uk/ptt_switch.htm—Aug. 18, 2010—4 pages.

* cited by examiner

METHOD AND APPARATUS FOR COMMUNICATING AMONGST TWO-WAY RADIOS

FIELD OF THE DISCLOSURE

The present disclosure relates generally to communication systems, and more particularly, to a method for two-way radios to communicate amongst themselves.

BACKGROUND

Two-way radios can transmit as well as receive and provide users the ability to wirelessly communicate with each other on a small network over a radio channel. Two-way radios are mostly used by mobile field personnel in agencies such as police, fire departments, detective agencies, highway patrol, border patrol, crime investigation agencies, emergency medical services, municipal services, military, and the like to communicate with other mobile field personnel in the particular agency or a talk group. Two-way radios are available in mobile, stationary base, hand-held portable, and vehicle mounted configurations.

Two-way radios usually operate either in a conventional communication system or in a trunked communication system. In both of these systems, a user of a two-way radio presses a push-to-talk (PTT) button to request an opportunity to transmit. Alternatively, in another example of the conventional communication system, the user of the two-way radio may directly start transmitting after pressing the PTT button. In the conventional communication system, the radio channels over which a particular group of two-way radios communicate are dedicated for the group and cannot be assigned to any other group even if the dedicated radio channels are idle. Whereas, in the trunked communication system, a pool of all the radio voice channels is maintained and a radio control channel is used to assign a radio voice channel to a particular group of two-way radios from the pool as and when required. The radio voice channel is later returned to the pool upon completion of communication between the particular groups of two-way radios.

In the conventional communication system, the communication between the transmitting two-way radio and the receiving two-way radio(s) goes through a repeater. In the trunked communication system, the communication between the transmitting two-way radio and the receiving two-way radio(s) goes through a trunked system comprising a system controller which communicates with radios by means of a control channel. However, there can be situations where a user of a two-way radio desires to quickly and efficiently communicate with another two-way radio or a group of two-way radios without using the repeater or the trunked system.

Accordingly, there is a need for an improved two-way radio which can communicate directly with other two-way radio(s) alleviating the need for an interim network element such as the repeater or the trunked system to relay communications.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Features of the present invention, which are believed to be novel, are set forth in the drawings and more particularly in the appended claims. The invention, together with the further objects and advantages thereof may be best understood with reference to the following description, taken in conjunction with the accompanying drawings. The drawings show a form of the invention that is presently preferred; however, the invention is not limited to the precise arrangement shown in the drawings.

Figure 1:
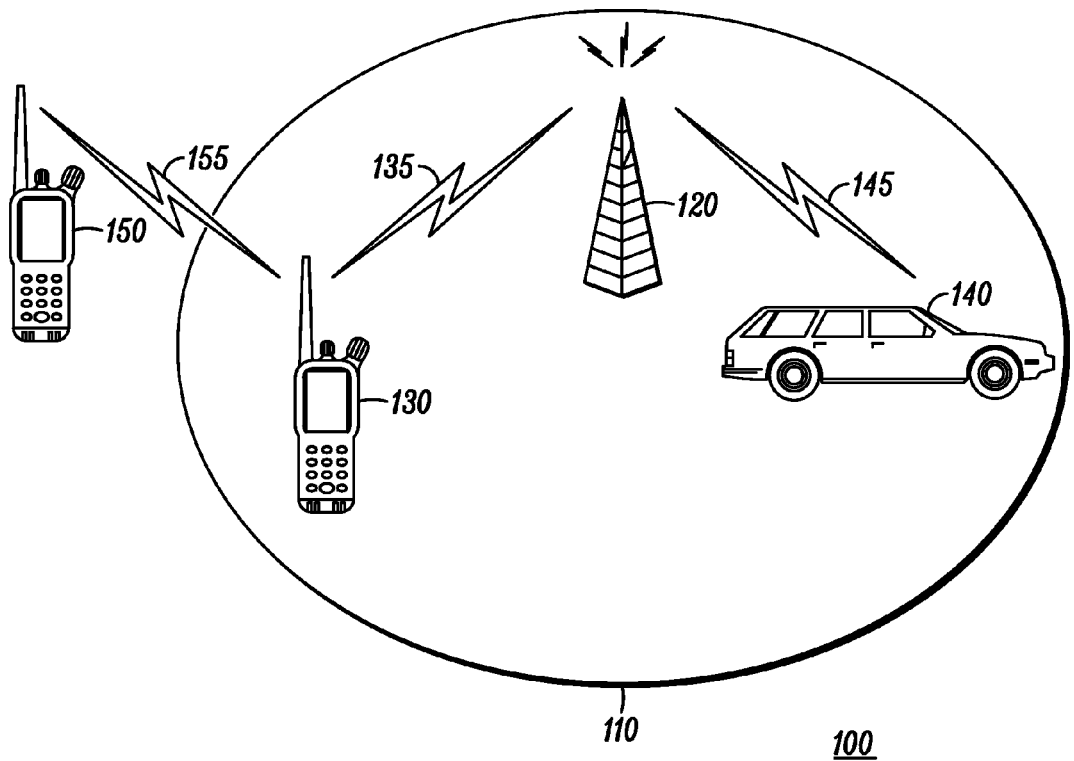
FIG. 1 is a system diagram of a communication system operating in accordance with an embodiment of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and system components related to a method and apparatus for communicating amongst two-way radios. Accordingly, the system components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In the description herein, numerous specific examples are given to provide a thorough understanding of various embodiments of the invention. The examples are included for illustrative purpose only and are not intended to be exhaustive or to limit the invention in any way. It should be noted that various equivalent modifications are possible within the spirit and scope of the present invention. One skilled in the relevant art will recognize, however, that an embodiment of the invention can be practiced with or without the apparatuses, systems, assemblies, methods, components mentioned in the description.

The present invention aims to utilize two-way radios having two PTT devices operating in either trunked or conventional communication systems. The first PTT device is used to operate the radio in a trunked or conventional mode of operation depending upon the available communication system. The second PTT device, in accordance with an embodiment, is used to operate the two-way radio in an intercom mode of operation. During a trunked or conventional mode of operation, the two-way radio receives signals or transmits signals over an operating frequency to or from a network element. And, during the intercom mode, in accordance with an embodiment the two-way radio is able to directly receive signals and transmit signals to and from other two-way radio(s) without the use of a network element on an auxiliary channel. The invention may be further described in detail as below. The auxiliary channels are non-priority channel frequencies which are utilized to provide radio-to-radio communication in a user friendly manner.

Referring to FIG. 1, there is shown a communication system 100 operating in accordance with an embodiment of the invention. Communication system 100 comprises a network element 120 in communication with a handheld two-way radio 130 and a vehicle mounted two-way radio 140 within the coverage area 110 of the network element 120. The communication system 100 also includes another handheld two-way radio 150 outside the coverage area 110 of the network element 120. The two-way radios 130, 140, 150 can belong to one or more agencies or departments. For example, devices 130 and 140 may belong to a police department, devices 130 and 150 may belong to a fire department, and device 140 may belong to an emergency health services center.

In the example of FIG. 1, the communication system 100 can be a trunked communication or a conventional communication system. The network element 120 may be a trunked system, a computer connected to a trunked system, a base station, a transceiver connected to a base station, a repeater, or any other fixed network infrastructure element. The network element 120 connects the communication system 100 with Public Switched Telephone Network (PSTN), internet, or other communication systems.

In the example of FIG. 1, the handheld two-way radios 130, 150 and the vehicle mounted two-way radio 140 includes two PTT devices (not shown). The first PTT device is utilized by the two-way radios 130, 140, 150 to operate the radio in the trunked or conventional mode of operation depending upon the type of communication system 100 in which the two-way radios 130, 140, 150 operate. The second PTT device in accordance with the various embodiments to be described herein is utilized by the two-way radios 130, 140, 150 to operate in the intercom mode of operation. The intercom mode can be utilized between radios over short range or long range communication including but not limited to Bluetooth, WiFi, Mesh, Infrared, wireless LAN, WiMAX, Cellular, APCO, P25, and the like. Additionally, the intercom mode can be used in conjunction with any communication protocol operating within these various communication systems.

In accordance with various embodiments, in either the conventional or trunked mode the first two-way radio 130 can communicate directly with the second two-way radio 140 using a radio channel 155 without going through the network element 120, by using the second PTT device. Moreover, the network element 120 can also receive signals from the first radio 130 over a radio channel 135 and can further transmit these signals to the vehicle mounted two-way radio 140 using another radio channel 145. The radio channels 135, 145, 155 can be defined as radio frequencies sufficient for sustaining communication. The radio channels 135, 155 can also be called as auxiliary channel. The method is explained in detail with reference to FIGS. 4 and 5.

Figure 2:
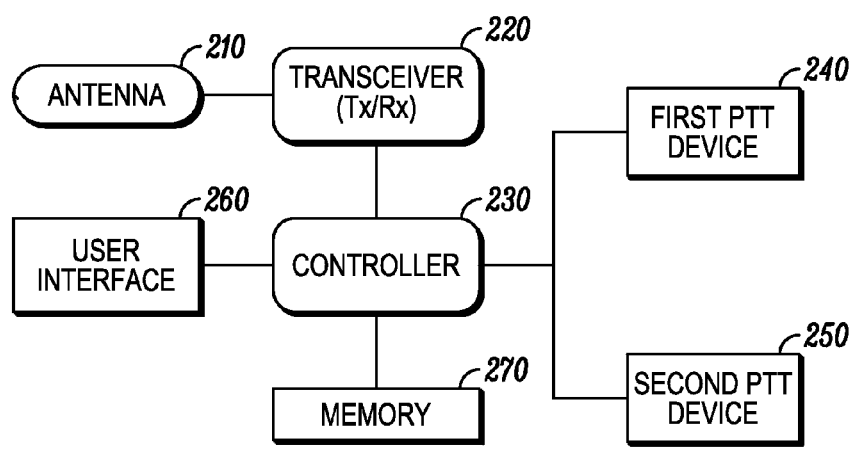
FIG. 2 is a block diagram of a two-way radio in accordance with an embodiment of the invention.

FIG. 2 shows a block diagram 200 of a two-way radio 130 in accordance with an embodiment of the invention. The two-way radio comprises an antenna 210, a transceiver 220, a controller 230, a first PTT device 240, a second PTT device 250, a user interface 260, and a memory 270. The antenna 210 transmits or receives RF signals and sends the RF signals to the transceiver 220. The transceiver 220 includes a transmitter and a receiver. The receiver receives the RF signals received by the antenna 210 and processes the RF signal into a usable form such as sound, pictures, digital data, etc. On the other hand, the transmitter converts the baseband signals from a user into RF signals and sends them to the antenna 210 for long range transmission. The first PTT device is a PTT button which can be used to operate the two-way radio 200 in a trunked of conventional mode of operation. The second PTT device comprises another PTT button which is used to operate the radio 200 in an intercom mode of operation in accordance with the various embodiments. The user interface 260 may include a microphone, a speaker, a display, a printer, a mouse etc. The memory 270 stores data including audio, text, programs, and other types of information. The controller 230 is coupled to all these elements, namely, the transceiver 220, the first PTT device 240, the second PTT device 250, the user interface 260, and the memory 270, and controls the functioning of the two-way radio 200. The components of the two-way radio 200 are further described in detail below.

Figure 3:
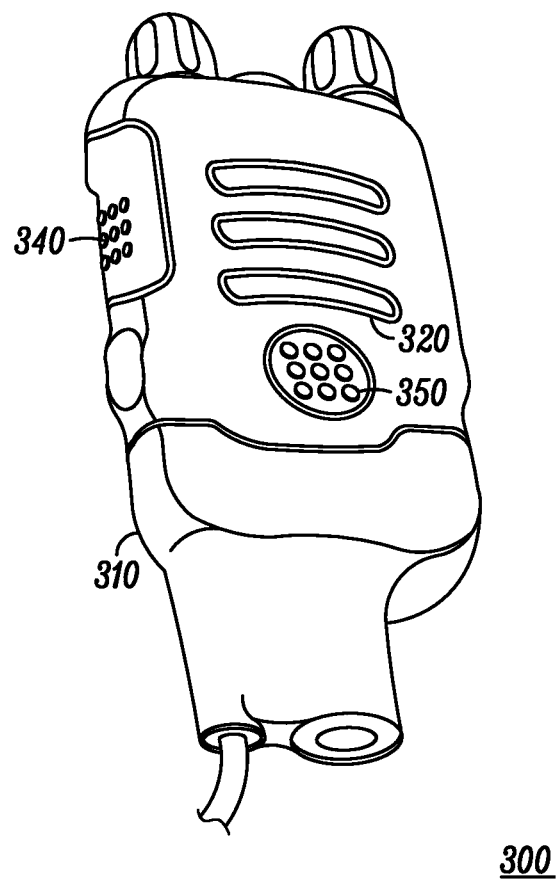
FIG. 3 shows an illustrated view of a two-way radio in accordance with an embodiment of the invention.

In the example of FIG. 2, the two-way radio 200 includes two PTT devices 240, 250 such that upon depression of the first PTT device 240, the two-way radio 200 communicates with other two-way radio(s) using a network element (such as element 120, shown in FIG. 1) and upon depression of the second PTT device 250, the two-way radio 200 communicates directly with other two-way radio(s) without using the network element. The placement of the two PTT buttons 240, 250 on the two-way radio are in different planes to avoid any confusion between the two PTT buttons 240, 250 as shown in the example of FIG. 3. Turning to FIG. 3, the two-way radio 300 is shown that includes a first PTT button 340 on a traditional left-side plane 310 of the two-way radio 300. The radio 300 also includes a second PTT button 350 on a front-side plane 320 of the radio 300. Placement of the second PTT button 350 is on a completely different plane from the one on which the first PTT button 340 is embedded. Placement of the two PTTs on different planes helps to minimize any confusion between the first PTT button 340, also called a main PTT, and the second PTT button 350, also called an auxiliary PTT. While other configurations and placement of the two PTT buttons is not out of the scope of this invention, the placement on two different planes is preferred.

Referring back to FIG. 2, the operation of the two-way radio 200 in a trunked communication system and in a conventional communication is explained in detail below using FIGS. 4 and 5, respectively.

Figure 4:
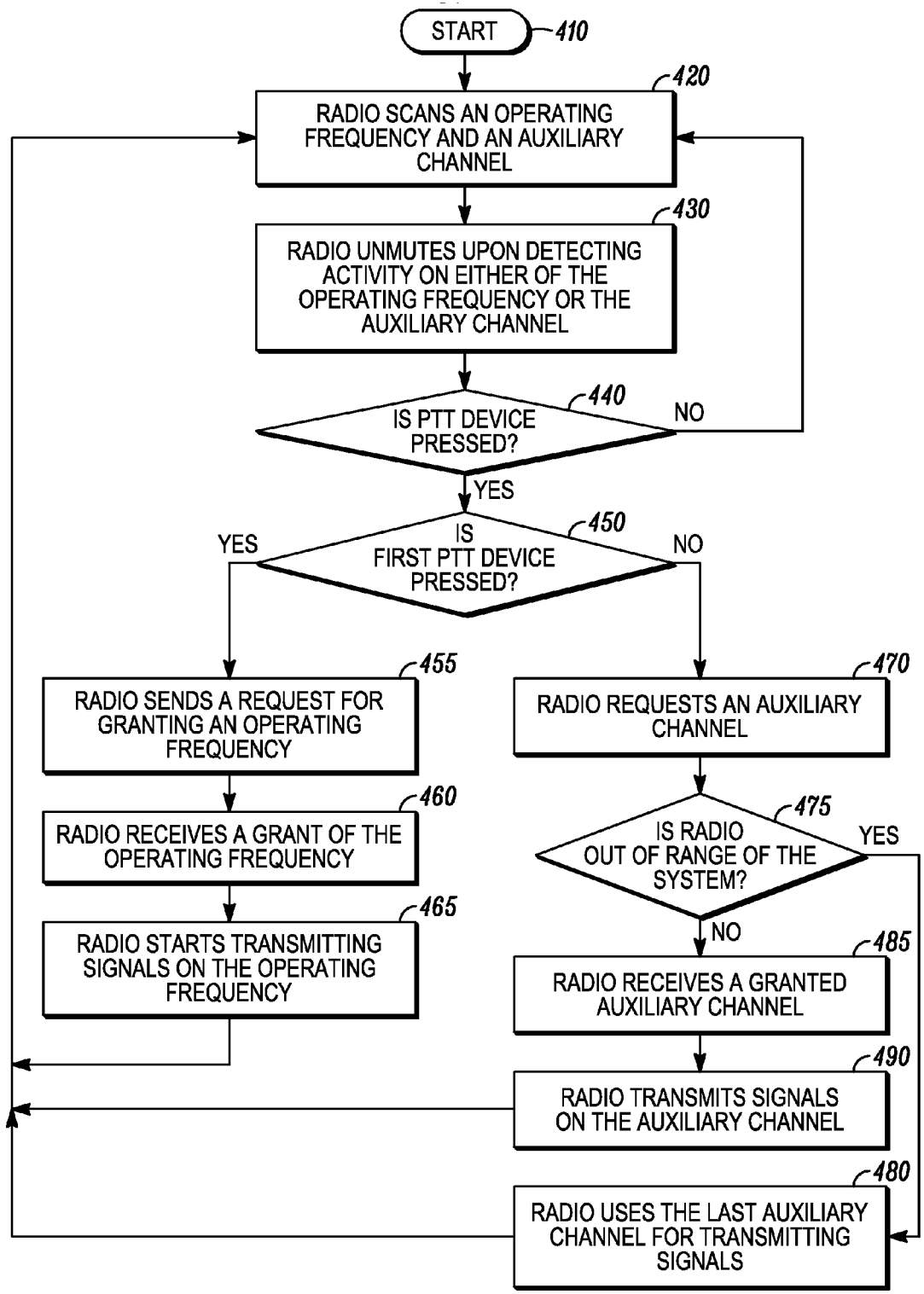
FIG. 4 is a flowchart of a method for communication amongst two-way radios operating in a trunked communication system in accordance with an embodiment of the invention.

The method 400 of FIG. 4 starts 410 when the two-way radio 200 is powered ON. After powering ON, the receiver 220 of the two-way radio 200 using the antenna 210 scans 420 a priority operating frequency (priority scan) and then an auxiliary channel (auxiliary scan). The operating frequency is the frequency of a voice channel used for receiving and transmitting signals by the radio 200 from a network element, thereby operating in the trunked mode of operation. In the trunked system, the voice channel is assigned to the two-way radio 200 and other radios operating within a same talkgroup by the network element using a control channel. The auxiliary channel is the frequency used by the radio 200 to receive and transmit signals directly to another two-way radio(s) without utilizing a trunked system, thereby operating in an intercom mode of operation. The auxiliary channel may be another voice channel (for trunked communication system) or a conventional channel assigned to the two-way radio 200 and other radios operating within a same intercom talkgroup by the network element.

When the receiver 220 determines activity on either of the operating frequency or the auxiliary channel, the controller 230 unmutes 430 a speaker associated in the user interface 260 of the two-way radio 200. In a first scenario, if the radio 200 determines activity on the operating frequency then the radio 200 unmutes the speaker and plays the signal received on the operating frequency on the speaker, thereby operating the radio 200 in the trunked mode of operation. During this mode, the radio 220 using the antenna 210 and the receiver 220 receives the signals transmitted by a network element such as a trunked system on the operating frequency. The trunked system, in turn, receives these signals from another two-way radio on the operating frequency. After receiving the signals on the operating frequency, the radio resumes scanning the auxiliary channel.

In a second scenario, if the radio 200 determines activity, such as voice activity, on the auxiliary channel then the radio 200 unmutes the speaker and plays the signal received on the auxiliary channel on the speaker, thereby operating the radio 200 in the intercom mode of operation. During the intercom mode, the radio 220 using the antenna 210 and the receiver 220 receives the signals transmitted by another two-way radio (such as radio 150, shown in FIG. 1) on the auxiliary channel directly without the use of the trunked system.

However, the two-way radio 200 scans the operating frequency before the auxiliary channel. Therefore, in a scenario where the activity is present on the operating frequency as well as on the auxiliary channel, the radio 200 will first detect activity on the operating frequency and receive the signal over the operating frequency. Also, while receiving signals over the auxiliary channel in the intercom mode, the radio 200 using the receiver 220 and the antenna 210 keeps scanning the operating frequency periodically, i.e. priority scan. Upon detecting activity on the operating frequency, the radio 200 tunes to the operating frequency and starts playing the signals received on the operating frequency, thereby operating in the trunked mode of operation. Therefore, the radio 200 keeps the operating frequency active by periodically scanning the operating frequency for detecting activity, while scanning the auxiliary channel or while receiving signals on the auxiliary channel or while transmitting signals on the auxiliary channel.

Next, the controller 230 of the radio 200 determines 440 if a PTT device 240, 250 is pressed. For the case when the controller 230 determines that no PTT device 240, 250 is pressed, then the controller 230 goes back to scanning the operating frequency and the auxiliary channel.

Alternatively, if the controller 230 determines that a PTT device 240, 250 is pressed, then the controller 230 further determines 450 if a first PTT device is pressed. For the case when the first PTT device 240 is pressed then the controller 230 of the radio 200 sends 455 a request to the trunked system using the transmitter 220 and the antenna 210 for granting the operating frequency to the two-way radio 200 for transmission. In response, the radio 200 receives 460 a grant of the operating frequency from the trunked system using the receiver 220. Subsequently, the radio 200 starts transmitting 465 signals on the operating frequency using the transmitter 220 and the antenna 210, thereby operating in the trunked mode of operation. The trunked system receives these signals transmitted by the two-way radio 200 and further transmits them to other two-way radios (such as vehicle mounted radio 140 shown in FIG. 1). After transmitting 465 the signal, the radio goes back to scanning 420 the operating frequency and the auxiliary channel. In one example, the signals transmitted by the radio 200 are received from a user of the radio 200. In another example, the signals transmitted by the radio 200 are retrieved from the memory 270.

However, if the controller 230 determines that the first PTT device 240 is not pressed, the controller 230 concludes that the second PTT device 250 is pressed. In one embodiment, the controller 230 using the transmitter 220 and the antenna 210 sends 470 a request to the trunked system for granting the auxiliary channel for transmission to the radio 200. In another embodiment, the trunked system continuously broadcasts the frequency of an auxiliary channel that is available for use to the radios.

The controller 230 further determines 475 if the radio 200 is out of the coverage area of the trunked system, such as the coverage area 110 shown in FIG. 1. When the controller 230 determines that the radio is out if the coverage area, the controller 230 uses 480 a frequency previously assigned to the radio 200 by the trunked system as an auxiliary channel. The controller 230 instructs the transmitter 220 and the antenna 210 to use this frequency for transmitting 480 the signals, thereby operating the radio 200 in the intercom mode of operation. These transmitted signals are received directly by the other two-way radios scanning frequency of the auxiliary channel without going through the trunked system. Moreover, the transmitted signals can also be received by the trunked system (for example, system controller) and are further transmitted to another radio or group of radios by the trunked system over the system's control channel. After transmitting 480 the signal, the radio 200 goes back to scanning 420 the operating frequency and the auxiliary channel.

When the controller 230 determines that the radio 200 is within the coverage area of the trunked system, then the radio receives 485 a granted auxiliary channel from the trunked system using the receiver 220 and the antenna 210. This grant from the trunked system may also include a channel assignment for the operating frequency associated with a selected talk group for the radio 200 to scan. Moreover, in one example the trunked system may also assign specific two-way radios, such as specific crew members from the fire department to the auxiliary channel, thereby forming a group of two-way radios which scan on the auxiliary channel and operate in the intercom mode. In another example, the trunked system may assign all the two-way radios to form a group of two-way radios operating in the intercom mode. In yet another example, the radio 200 may also form a pre-determined group of two-way radios, which scans the auxiliary channel.

Next the radio 200, using the transmitter 220 and the antenna 210 transmits 490 signals on the auxiliary channel, thereby operating the radio 200 in the intercom mode of operation. These transmitted signals are received directly by the other two-way radios scanning the auxiliary channel without going through a network element, such as the trunked system, thereby providing intercom radio-to-radio communication amongst all radios performing scanning on the auxiliary channel.

However, the radio 200 keeps scanning the received operating frequency periodically during transmissions 480, 490 on the auxiliary channel. Upon detecting activity on the operating frequency, the radio 200 tunes back to the operating frequency and starts playing the signal received over the operating frequency on the speaker associated with the user interface 260, thereby operating in the trunked mode of operation. After transmitting 480 the signal, the radio 200 goes back to scanning 420 the operating frequency and the auxiliary channel.

The operation of the two-way radio 200 in a conventional communication system is explained in detail below using FIGS. 2 and 5.

Figure 5:
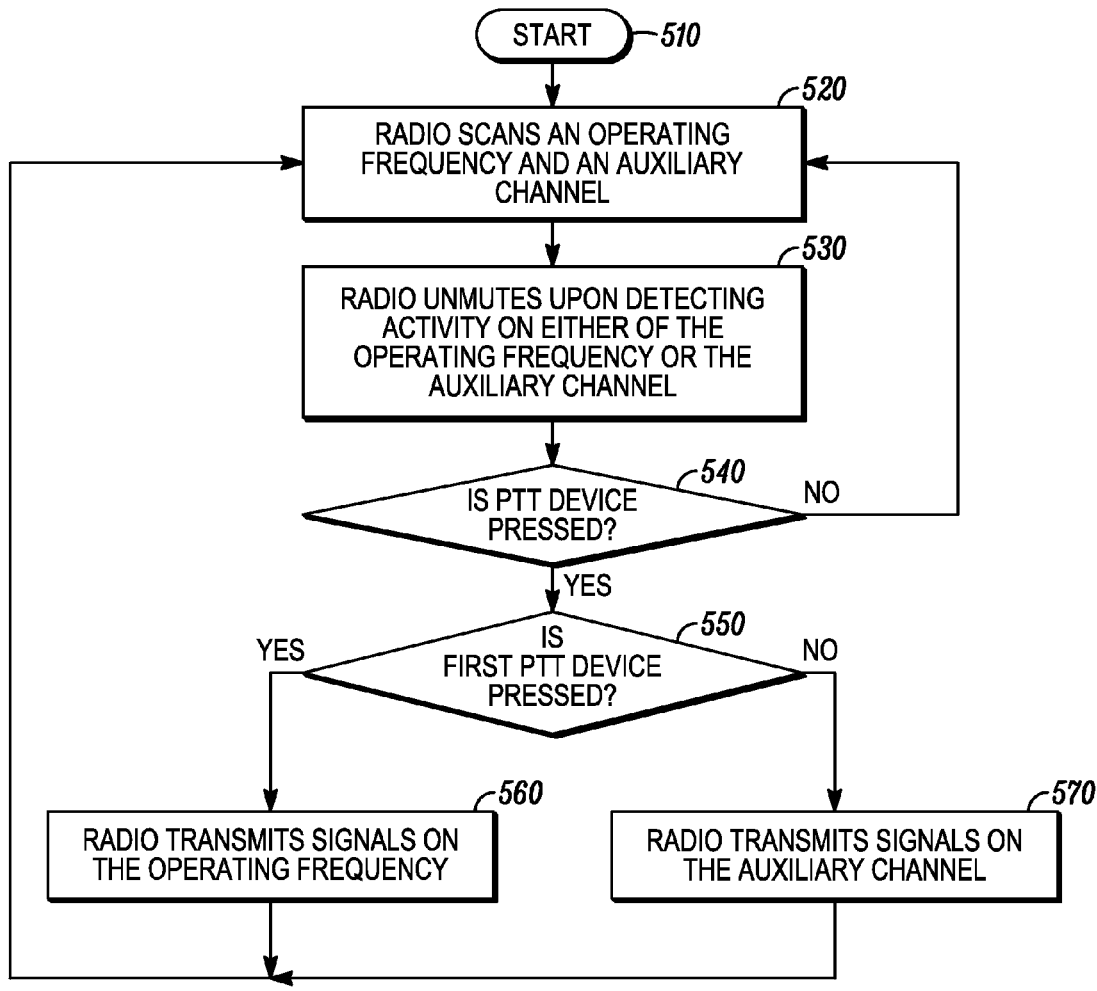
FIG. 5 is a flowchart of a method for communication amongst two-way radios operating in a conventional communication system in accordance with an embodiment of the invention.

The method 500 of FIG. 5 starts 510 when the two-way radio 200 is powered ON. After powering ON, the receiver 220 of the two-way radio 200 using the antenna 210 scans 520 a priority operating frequency (priority scan) and then an auxiliary channel (auxiliary scan). In the example of conventional communication system, the auxiliary channel is preconfigured in the radio 200 by a user of the radio 200. The user pre-configures the auxiliary channel into the radio 200 by using the user interface 260 and is further stored into the memory 260. The operating frequency is the frequency of a voice channel used for receiving and transmitting signals by the radio 200 from and to a network element, such as a repeater, thereby operating the radio 200 in the conventional mode of operation. The auxiliary channel is the frequency used by the radio 200 to receive and transmit signals directly to another two-way radio(s) without utilizing a repeater, thereby operating in an intercom mode of operation. When the receiver 220 determines activity on either of the operating frequency or the auxiliary channel, the controller 230 unmutes 430 a speaker associated in the user interface 260 of the two-way radio 200.

In a first scenario, if the radio 200 determines activity on the operating frequency then the radio 200 unmutes the speaker and plays the signal received on the operating frequency on the speaker, thereby operating the radio 200 in the conventional mode of operation. During this mode, the radio 220 utilizes the antenna 210 and the receiver 220 to receive signals transmitted by a network element such as a repeater on the operating frequency. The repeater in turn receives these signals from another two-way radio on the operating frequency.

In a second scenario, if the radio 200 determines activity on the auxiliary channel then the radio 200 unmutes 530 the speaker and plays the signal received on the auxiliary channel on the speaker, thereby operating the radio 200 in the intercom mode of operation. During this mode, the radio 220 using the antenna 210 and the receiver 220 receives the signals transmitted by another two-way radio on the auxiliary channel directly without the use of the repeater.

However, the two-way radio 200 scans the operating frequency on priority before the auxiliary channel. Therefore, in a scenario where the activity is present on the operating frequency as well as the auxiliary channel, the radio 200 will first detect activity on the operating frequency and receive the signal over the operating frequency. Also, while scanning the auxiliary channel or while receiving signals over the auxiliary channel or while transmitting signals over the auxiliary channel in the intercom mode, the radio 200 using the receiver 220 and the antenna 210 keeps scanning the operating frequency periodically and upon detecting activity on the operating frequency, the radio 200 tunes back to the operating frequency and starts operating in the conventional mode of operation. Therefore, the radio 200 keeps the operating frequency active by periodically scanning the operating frequency while operating in the intercom mode.

Next, the controller 230 of the radio 200 determines 540 if a PTT device 240, 250 is pressed. In case, if the controller 230 determines that no PTT device 240, 250 is pressed, then the controller 230 goes back to scanning the operating frequency and the auxiliary channel.

Alternatively, if the controller 230 determines that a PTT device 240, 250 is pressed, then the controller 230 further determines 550 if a first PTT device is pressed. In case, when the first PTT device 240 is pressed then the controller 230 of the radio 200 starts transmitting 560 signals on the operating frequency using the transmitter 220 and the antenna 210, thereby operating the radio 200 in the conventional mode of operation. These transmitted signals are received by the repeater and are further transmitted to other two-way radios (such as vehicle mounted radio 140 shown in FIG. 1) by the repeater. After transmitting 560 the signal, the radio goes back to scanning 520 the operating frequency and the auxiliary channel.

However, if the controller 230 determines that the first PTT device 240 is not pressed, the controller 230 concludes that the second PTT device 250 is pressed. Now, the radio 200 using the transmitter 220 and the antenna 210 transmits signals on the auxiliary channel, thereby operating the radio 200 in the intercom mode of operation. These transmitted signals are received directly by the other two-way radios scanning the auxiliary channel without going through a repeater. Moreover, the transmitted signals can also be received by the repeater and are further transmitted to another radio or group of radios by the repeater.

However, the radio 200 keeps scanning the operating frequency periodically during transmissions 570 on the auxiliary channel. Upon detecting activity on the operating frequency, the radio 200 tunes back to the operating frequency and starts playing the signal received over the operating frequency on the speaker associated with the user interface 260, thereby operating in the conventional mode of operation. After transmitting 570 the signal, the radio 200 goes back to scanning 520 the operating frequency and the auxiliary channel.

The above described methods and embodiments can facilitate a two-way radio to communicate directly with another two-way radio(s) scanning the auxiliary channel without going through a network element, such as a trunked system or a repeater. Therefore, a user of a two-way radio, using the intercom mode, can efficient and quickly communicate with another radio or a group of radios. Using the conventional system, the user coordinates access to the intercom mode by pre-configuring the auxiliary channel. And, using the trunked system, the electronic control permits the intercom mode to take advantage of idle channels thereby improving shared channel capacity. In either mode, the user can easily use the second PTT device without going through the cumbersome steps to change channels for intercom operation.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. A device or structure that is "configured" in a certain way is configured in at least that way, but may also be configured in ways that are not listed.

It will be appreciated that some embodiments may be comprised of one or more generic or specialized processors or "processing devices" such as microprocessors, digital signal processors, customized processors and field programmable gate arrays FPGAs and unique stored program instructions including both software and firmware that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits ASICs, in which each function or some combinations of certain of the functions are implemented as custom logic. Of course, a combination of the two approaches could be used.

Moreover, an embodiment can be implemented as a computer-readable storage medium having computer readable code stored thereon for programming a computer e.g., comprising a processor to perform a method as described and claimed herein. Examples of such computer-readable storage mediums include, but are not limited to, a hard disk, a CD-ROM, an optical storage device, a magnetic storage device, a ROM Read Only Memory, a PROM Programmable Read Only Memory, an EPROM Erasable Programmable Read Only Memory, an EEPROM Electrically Erasable Programmable Read Only Memory and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for communicating amongst two-way radios, the method comprising:
    operating, at least one radio, in either a trunked mode or conventional mode over an operating frequency by a first PTT button located on the at least one radio and operating, the at least one radio, in an intercom mode over an auxiliary frequency by a second PTT button located on the at least one radio, the first PTT button and the second PTT button being located on the same at least one radio;
    scanning an operating channel, by the at least one radio, to enable radio communication in the trunked mode or the conventional mode on the operating channel and scanning an auxiliary channel, by the at least one radio, to enable radio communication in the intercom mode on the auxiliary channel while maintaining the operating frequency active by periodically scanning the operating frequency;
    detecting a signal on the auxiliary channel with another radio; and
    communicating on the auxiliary channel in the intercom mode to provide an intercom radio-to-radio communication amongst all radios scanning on the auxiliary channel, wherein the auxiliary channel is a dedicated frequency for intercom mode when the at least one radio operates in the conventional mode of operation, and the auxiliary channel is a frequency assigned by a trunked system when the at least one radio operates in the trunked mode of operation.

2. The method of claim 1, wherein operating in either a trunked mode or conventional mode is based on the first PTT button being pressed and communicating on the auxiliary channel in the intercom mode is based on the second PTT button being pressed.

3. The method of claim 1, wherein the at least one radio ceases scanning the auxiliary channel and starts receiving signals on the operating frequency, in response to detecting voice activity on the operating frequency.

4. The method of claim 3, wherein the at least one radio resumes scanning the auxiliary frequency after receiving the signals on the operating frequency.

5. The method of claim 1, wherein communication in one of the conventional mode or the trunked mode is based on a first PTT press and wherein a communication in the intercom mode is based on a second PTT press.

6. The method of claim 5 further comprising:
    forming a predetermined group of two-way radios which scans on the auxiliary channel based on the second PTT press.

7. The method of claim 5 further comprising:
    forming a group of two-way radios for operating in the intercom mode by a trunked system.

8. The method of claim 1, wherein the at least one radio operates through a repeater in the conventional mode of operation and the at least one radio operates through a trunked system in the trunked mode of operation.

9. The method of claim 1, wherein the auxiliary channel is requested by the at least one radio and granted by a trunked system when the at least one radio operates in the trunked mode of operation.

10. The method of claim 1, wherein the at least one radio performs a priority scan of the operating channel when the at least one radio operates in the intercom mode of operation.

11. The method of claim 1, wherein the at least one radio performs a priority scan of the operating frequency when the at least one radio operates in the conventional mode of operation.

12. The method of claim 1, wherein during the trunked mode of operation the at least one radio uses a frequency previously assigned by a trunked system as the auxiliary channel when the at least one radio is out of coverage range of the trunked system.

13. A radio, comprising:
an antenna configured to:
> scan an operating frequency used to operate the radio in either a trunked mode or a conventional mode and
> scan an auxiliary frequency used to operate the radio in an intercom mode while maintaining the operating frequency active by periodically scanning the operating frequency;

a transceiver;

a controller coupled to the transceiver to detect a signal on an auxiliary channel; and a first PTT button and a second PTT button coupled to the controller of the radio, the first PTT button being used to operate the radio in either the trunked mode or the conventional mode, while the second PTT button enables a scan mode for intercom operation from the radio directly with another radio.

14. The radio of claim 13, wherein the radio operates directly with the another radio on the auxiliary frequency during the intercom operation.

15. The radio of claim 14, wherein the auxiliary channel is a dedicated frequency for intercom operation when the radio operates in the conventional mode, and the auxiliary channel is a frequency assigned by a trunked system when the radio operates in the trunked mode.

16. The radio of claim 15, wherein the dedicated frequency for intercom operation is user configurable when the radio operates in the conventional mode.

17. The radio of claim 13, wherein the first PTT button is configured on a first plane of the radio and the second PTT button is configured on a second plane of the radio.

\* \* \* \* \*